United States Patent Office 3,297,680
Patented Jan. 10, 1967

3,297,680
HALOALKENYL DISUBSTITUTED
THIONOCARBAMATES
Philip C. Hamm, Webster Groves, Mo., and John J.
D'Amico, Charleston, W. Va., assignors to Monsanto
Company, St. Louis, Mo., a corporation of Delaware
No Drawing. Filed Sept. 26, 1962, Ser. No. 226,437
8 Claims. (Cl. 260—239)

This application is a continuation-in-part of copending application Serial No. 721,360, filed March 14, 1958, and now abandoned.

The present invention relates to halogen substituted alkenyl esters of thionocarbamic acids, to herbicidal compositions containing the new compounds and to methods of destroying vegetation using these herbicidal compositions.

The new compounds contain the nucleus

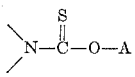

where A is a halogen substituted alkenyl group containing less than five carbon atoms. By halogen substituted alkenyl group is meant an open chain unsaturated radical having one double bond and at least one halogen substituent. The dangling valences on the nitrogen may be satisfied by a wide variety of non aromatic organic radicals but not by hydrogen. In other words, the nitrogen atom should be linked to three carbon atoms. For example, the dangling valences on the nitrogen may be satisfied by members of the class consisting of open chain saturated and unsaturated non aromatic radicals and divalent aliphatic radicals which, with the nitrogen, constitute a heterocyclic group. By non aromatic radicals are meant radicals in which the carbon attached to the nitrogen of the above nucleus is not part of an aromatic ring.

Examples of the new compounds are represented by the 2-chloroallyl, 2-bromoallyl, 3- chloroallyl, 3-iodoallyl, 2-fluoro-3-chloroallyl, 3-bromo-2-butenyl, 3-chloro-2-butenyl, 2,3-dichloroallyl, 3,3-dichloroallyl, 2,3-dichloro-2-butenyl, 2,3-diiodo-2-butenyl, 2,3-dibromoallyl, 2,3-dichloro - 4 - bromobutenyl and 2,3,3-trichloroallyl esters of the following thionocarbamic acids: dimethyl-, diethyl-, dibutyl-, dipropyl-, diallyl-, diisopropyl-, diisobutyl-, (allyl)isopropyl-, di(methoxyethyl)-, (methyl)-cyclohexyl-, (ethyl)cyclohexyl-, (2-cyclohexenyl)isopropyl-, (2-cyanoethyl)isopropyl-, (2-chloroallyl)isopropyl-, (2-chloroallyl)-3-methoxypropyl-, di(2-phenoxyethyl)-, (ethyl)-2-phenoxyethyl-, di(2-chloroallyl)-, (ethyl)vinyloxyethyl-, (ethyl)isopropoxypropyl-, di(methoxypropyl)- and di(ethoxypropyl)thionocarbamic acids, 4-morpholinecarbothionic acid, 1-pyrrolidinecarbothionic acid, 4-phenyl-1-piperazinecarbothionic acid, 1-piperidinecarbothionic acid, 2-methyl-1-piperidinecarbothionic acid, 5-ethyl-2-methyl-1-piperidinecarbothionic acid, 5-ethyl-3-methyl-1-piperidinecarbothionic acid, 2,4,6-trimethyl-1-piperidinecarbothionic acid, 2,6-dimethylmorpholine carbothionic acid and 1-hexamethyleniminecarbothionic acid.

The compounds may be prepared by several methods. The following examples illustrate the preparation but the invention is not limited thereto.

Example 1

To 151.7 parts by weight (1.0 mole) of diethylthiocarbamyl chloride in about 440 parts by weight of dry benzene was added in one portion 92.6 parts by weight (1.0 mole) of 2-chloro-2-propen-1-ol. The stirred mixture was then heated at reflux for 18 hours, cooled to 25° C. and the impurities filtered off. The benzene was removed by distillation. Vacuum distillation of the residue gave a 24.2% yield of 2-chloroallyl diethylthionocarbamate, B.P. 134–136° C./17 mm. Analysis gave 6.9% nitrogen as compared to 6.7% calculated for $C_8H_{14}ClNOS$.

A somewhat higher yield was obtained by heating for 5 hours at 95–98° C. a mixture of 92.6 parts by weight (1.0 mole) of 2-chloro-2-propen-1-ol, 151.7 parts by weight (1.0 mole) of diethylthiocarbamyl chloride, 138 parts by weight of potassium carbonate and about 345 parts by weight of heptane. The mixture was then cooled to 25° C., filtered and the heptane removed by distillation in vacuo. The yield was 47.8% of a dark amber oil analyzing 6.6% nitrogen, 15.0% sulfur and 17.4% chlorine as compared to 6.7% nitrogen, 15.4% sulfur and 17.1% chlorine calculated for $C_8H_{14}ClNOS$.

The most satisfactory and preferred procedure was carried out as follows: To a stirred solution of 27.1 parts by weight (0.255 mole) of sodium carbonate in 200 parts by weight of water was added 47.3 parts by weight (0.5 mole) of monochloracetic acid to form a solution having a pH of 8. The addition was carried out at a temperature of 10–20° C. over a 10 minute period. Stirring was continued for 15 minutes and then 103.4 parts by weight (0.5 mole) of potassium 2-chloroallylxanthate was added in one portion. The endothermic reaction which first set in caused a drop in temperature from 23 to 15° C. The exothermic reaction which followed caused a temperature rise to 38° C. over a 20 minute period. The reaction mixture was stirred for one and one-half hours at 15–39° C., then cooled to 10° C. and 43.9 parts by weight (0.6 mole) of diethylamine added in one portion. The heat of reaction caused a temperature rise to 36° C. in 5 minutes. The product was stirred for 5 hours while maintaining the temperature at 25–30° C. The top organic layer which separated was heated in vacuo (14 mm.) at a maximum temperature of 60° C. for 3 hours and then filtered. The 2-chloroallyl diethylthionocarbamate was obtained in 77.5% yield as an amber. liquid. The product was distilled collecting the fraction B.P. 83–84° C./2 mm. Analysis gave 6.5% nitrogen, 15.4% sulfur and 17.3% chlorine as compared to 6.7% nitrogen, 15.4% sulfur and 17.1% chlorine calculated for $C_8H_{14}ClNOS$.

Example 2

In this example 92.6 parts by weight (1.0 mole) of 2-chloro-2-propen-1-ol was added in one portion to a stirred solution of 179.7 parts by weight (1.0 mole) of dipropylthiocarbamyl chloride in about 300 parts by weight of pyridine. The mixture was then heated at 85–90° C. for 24 hours, cooled to 25° C. and 400 parts by weight of water added. Stirring was continued for 15 minutes and the reaction mixture then extracted with about 360 parts by weight of ethyl ether. The ether solution was washed with water until neutral to litmus, dried over sodium sulfate and the ether removed in vacuo. The residue was distilled in vacuo, the fraction B.P. 142–144° C./6 mm. being collected. The 2-chloroallyl dipropylthionocarbamate was obtained in 31.9% yield and analyzed 6.1% nitrogen, 13.5% sulfur and 15.1% chlorine as compared to 5.9% nitrogen, 13.6% sulfur and 15.0% chlorine calculated for $C_{10}H_{18}ClNOS$. The same compound was obtained in 75% yield via the xanthate by the procedure described in the third paragraph of Example 1. The reactants and proportions were 47.3 parts by weight of monochloracetic acid neutralized with 27.1 parts by weight of sodium carbonate in 200 parts by weight of water, 103.4 parts by weight of potassium 2-chlorallylxanthate and 60.8 parts by weight of dipropylamine.

Example 3

A sample of 2-chloroallyl dimethylthionocarbamate was successfully prepared in a yield of 13.4% employing an excess of the alcohol but no other solvents. Dimethylthiocarbamyl chloride, 123.6 parts by weight (1.0 mole), was added to 386 parts by weight of 2-chloro-2-propen-1-ol in small portions and the mixture then heated at 75–85° C. for 24 hours. After cooling to 25° C. the product was filtered to remove small amounts of impurities and the excess alcohol removed by distillation (B.P. 60–63° C./28 mm.). The residue was filtered to remove impurities and then distilled in vacuo. The fraction of 2-chloro-allyl dimethylthionocarbamate boiling at 125–126° C./12 mm. was collected as an amber liquid and analyzed 7.3% nitrogen as compared to 7.8% calculated for $C_6H_{10}ClNOS$. Preparation via the xanthate by the procedure described in the third paragraph of Example 1 gave an 80.5% yield. The reactants and proportions were 47.3 parts by weight of monochloracetic acid neutralized with 27.1 parts by weight of sodium carbonate in 200 parts by weight of water, 103.4 parts by weight of potassium 2-chloroallyl-xanthate and 108 parts by weight of 25% aqueous dimethylamine. Analysis gave 7.5% nitrogen, 18.1% sulfur and 20.1% chlorine. The values calculated for sulfur and chlorine were 17.9% sulfur and 19.7% chlorine.

Example 4

Substituting 77.5 parts by weight of dibutylamine for the 60.8 parts by weight or dipropylamine used in the second part of Example 2 gave an 81.4% yield of 2-chloroallyl dibutylthionocarbamate, an amber oil which contained 5.8% nitrogen and 12.2% sulfur compared to 5.3% nitrogen and 12.2% sulfur calculated for $$C_{12}H_{22}ClNOS$$

Example 5

To a stirred solution comprising 92.5 parts by weight (1.0 mole) of 2-chloro-2-propen-1-ol, 106 parts by weight (1.0 mole) of sodium carbonate and 400 ml. of benzene there was added in one portion 132.6 parts by weight (0.8 mole) of 4-morpholinothiocarbamyl chloride and the mixture then heated at refluxing temperature for 5 hours. After cooling to 25° C., 300 ml. of water was added, stirring continued for 15 minutes and the reaction mixture then filtered. The top benzene layer was separated, washed with water until neutral to litmus and dried over sodium sulfate. The benzene and excess alcohol were removed in vacuo at a maximum temperature of 80–90° C./1–2 mm. The product was cooled to 25° C. and after standing for 24 hours, a small amount of impurities were removed by filtration. 2-chloroallyl 4-morpholinecarbothionate was obtained in 61% yield as an amber oil analyzing 6.8% nitrogen compared to 6.3% calculated for $C_8H_{12}ClNO_2S$.

Example 6

In the procedure of Example 5, 31.8 parts by weight (0.25 mole) of cis- and trans-2,3-dichloro-2-propen-1-ol, 300 ml. of benzene, 26.3 parts by weight (0.25 mole) of sodium carbonate and 37.9 parts by weight (0.25 mole) of diethylthiocarbamyl chloride were used. A yield of 58.8% of cis- and trans-2,3-dichloroallyl diethylthionocarbamate was obtained as an amber oil.

Example 7

To 23.7 parts by weight (.025 mole) of chloracetic acid was added 13.6 parts by weight (0.128 mole) of sodium carbonate dissolved in 200 ml. of water to give a solution having a pH of about 8. The solution was stirred for 15 minutes at 20–25° C. and then 60.3 parts by weight (0.25 mole) of potassium 3,3-dichloroallylxanthate added in one portion at 23° C. The temperature dropped at first to 17° C. and then rose to a maximum of 31° C. After stirring the reaction mixture for one and one-half hours, it was cooled to 10° C. There was then added in one portion, 34 parts by weight (0.3 mole) of N-methyl-N-cyclohexylamine, causing the temperature to rise to 36° C. Stirring was continued for 5 hours and the reaction mixture then extracted with 400 ml. of ethyl ether. The ether extract was washed with two 200 ml. portions of water, then with 200 ml. of dilute hydrochloric acid solution followed by water until neutral to litmus. After drying over sodium sulfate the ether was removed in vacuo at a maximum temperature of 60° C./1–2 mm. 3,3-dichloroallyl N-cyclohexyl-N-methylthionocarbamate was obtained in 57% yield as an amber liquid. Analysis gave 4.0% nitrogen compared to 4.9% calculated for $C_{11}H_{17}Cl_2NOS$.

Employing the same reaction conditions and replacing N-methyl-N-cyclohexylamine with an equi-molar amount, respectively, of N-ethyl-N-cyclohexylamine, N-propyl-N-cyclohexylamine and N-isopropyl-N-cyclohexylamine, further examples were prepared possessing the following physical properties:

Example 8

3,3 - dichloroallyl N - cyclohexyl - N - ethylthionocarbamate, an amber liquid, in 46% yield.

Example 9

3,3 - dichloroallyl N - cyclohexyl - N - propylthionocarbamate, an amber liquid, in 55.5% yield. Analysis gave 4.0% nitrogen compared to 4.5% calculated for $$C_{13}H_{21}Cl_2NOS$$

Example 10

3,3 - dichloroallyl N - cyclohexyl -N - isopropylthionocarbamate, an amber liquid, in 36% yield. Analysis gave 3.7% nitrogen compared to 4.5% calculated for $$C_{13}H_{21}Cl_2NOS$$

Example 11

Substituting potassium 2-chloroallylxanthate for the xanthate in Example 7, 2-chloroallyl N-cyclohexyl-N-methylthionocarbamate was obtained as an amber oil in 61.5% yield. Analysis gave 5.4% nitrogen and 13.0% sulfur compared to 5.6% nitrogen and 12.9% sulfur calculated for $C_{11}H_{18}ClNOS$.

Similarly replacing N-methyl-N-cyclohexylamine with an equi-molar amount, respectively, of N-ethyl-N-cyclohexylamine, N-propyl-N-cyclohexylamine and N-isopropyl-N-cyclohexylamine, further examples were prepared possessing the following physical properties:

Example 12

2 - chloroallyl N - cyclohexyl N - ethylthionocarbamate, an amber liquid, in 38.2% yield. Analysis gave 5.0% nitrogen and 13.7% chlorine compared to 5.3% nitrogen and 13.5% chlorine calculated for $C_{12}H_{20}ClNOS$.

Example 13

2-chloroallyl N-cyclohexyl-N-propylthionocarbamate, an amber oil, in 61% yield. Analysis gave 5.1% nitrogen and 12.3% chlorine compared to 5.1% nitrogen and 12.8% chlorine calculated for $C_{13}H_{22}ClNOS$.

Example 14

2 - chloroallyl N - cyclohexyl-N-isopropylthionocarbamate, an amber liquid, in 47.8% yield. Analysis gave 4.6% nitrogen compared to 5.1% calculated for $C_{13}H_{22}ClNOS$.

Example 15

To a stirred slurry comprising 32 parts by weight (0.335 mole) of 2-chloro-2-propen-1-ol, 35 parts by weight (0.25 mole) of potassium carbonate and 300 ml. of heptane was added in one portion, with stirring, 37.4 parts by weight (0.25 mole) of pyrrolidinylthiocarbamoyl chloride. The stirred reaction mixture was heated at refluxing temperature for 6 hours and then filtered hot (60–70° C.) to remove any insoluble impurities. The solvent was removed in vacuo at a maximum temperature of 80–90° C./1–2 mm. 2-chloroallyl 1-pyrrolidinecarbothionate was obtained in 72% yield as an amber liquid. Analysis gave 6.9% nitrogen, 15.4% sulfur and 17.2% chlorine compared to 6.8% nitrogen, 15.6% sulfur and 17.2% chlorine calculated for $C_8H_{12}ClNOS$.

Employing the same procedure and replacing 2-chloro-2-propen-1-ol with an equi-molar amount, respectively, of 3,3-dichloro-2-propen-1-ol, 3-chloro-2-buten-1-ol, 3-chloro-2-propen-1-ol and cis- and trans-2,3-dichloro-2-propen-1-ol, further examples were prepared possessing the following physical properties:

Example 16

3,3-dichloroallyl 1-pyrrolidinecarbothionate, an amber liquid, in 75% yield.

Example 17

3-chloro-2-butenyl 1-pyrrolidinecarbothionate, an amber liquid, in 67.5% yield. Analysis gave 14.8% sulfur and 15.9% chlorine compared to 14.6% sulfur and 16.1% chlorine calculated for $C_9H_{14}ClNOS$.

Example 18

3-chloroallyl 1-pyrrolidinecarbothionate, an amber liquid, in 73.2% yield.

Example 19

2,3-dichloroallyl 1-pyrrolidinecarbothionate, an amber liquid, in 99% yield.

Example 20

A charge consisting of 88.9 parts by weight (0.5 mole) of dipropylthiocarbamyl chloride, 69.1 parts by weight (0.5 mole) of potassium carbonate and 63.5 parts by weight (0.5 mole) of cis- and trans-2,3-dichloro-2-propen-1-ol in 400 ml. of heptane was heated at refluxing temperature for 5 hours and then filtered hot. The solvent was removed in vacuo at a maximum temperature of 80–90° C./1–2 mm. and the product allowed to stand at room temperature for 24 hours. A small amount of impurities were removed by filtration whereupon cis- and trans-2,3-dichloroallyl dipropylthionocarbamate was obtained as an amber liquid in 73.1% yield. Analysis gave 5.2% nitrogen, 10.8% sulfur and 26.8% chlorine compared to 5.2% nitrogen, 11.9% sulfur and 26.2% chlorine calculated for $C_{10}H_{17}Cl_2NOS$.

Example 21

The dipropylthiocarbamyl chloride was substituted by 100 parts by weight (0.5 mole) of 90% diisopropylthiocarbamyl chloride in the procedure of Example 20. The oil, upon standing 24 hours at 25–30° C. deposited a solid which was removed by filtration and recrystallized from ethyl alcohol. The resulting white solid melted at 104–105° C. and was obtained in 32.4% yield. Elemental and infrared spectra analyses confirmed the product was cis-2,3-dichloroallyl diisopropylthionocarbamate.

Calculated for $C_{10}H_{17}Cl_2NOS$: nitrogen, 5.2%; sulfur, 11.9%; chlorine, 26.2%. Found: nitrogen 5.2%; sulfur, 11.7%; chlorine, 26.0%.

Additional solid deposited after standing another 24 hours. After recrystallization from ethyl alcohol the white solid so deposited melted at 87–88° C. and was obtained in 17% yield. Elemental and infrared spectra analyses indicated the product was trans-2,3-dichloroallyl diisopropylthionocarbamate: nitrogen, 5.2%; sulfur, 11.9% and chlorine, 26.2%.

Example 22

A mixture of 16.2 parts by weight (0.1 mole) of 2,3,3-trichloro-2-propen-1-ol, 13.8 parts by weight (0.1 mole) of potassium carbonate and 200 ml. of heptane was prepared and 21 parts by weight (0.1 mole) of dibutylthiocarbamyl chloride added in one portion. The reactants were heated at refluxing temperature for 6 hours, then filtered hot and the heptane removed in vacuo at a maximum temperature of 80–90° C./1–2 mm. 2,3,3-trichloroallyl dibutylthionocarbamate was obtained in 99% yield as an amber oil. Analysis gave 4.2% nitrogen and 9.3% sulfur compared to 4.2% nitrogen and 9.6% sulfur calculated for $C_{12}H_{20}Cl_3NOS$.

Other examples prepared by the same procedure as in Example 22 but substituting the appropriate reactants are summarized in tabular form below. All were amber oils:

TABLE I

| Example No. | Product | Yield, percent |
|---|---|---|
| 23 | cis- and trans-2,3-dichloroallyl 1-hexamethyleniminecarbothionate. | 74.5 |
| 24 | 2,3,3-trichloroallyl 1-hexamethylenimine-carbothionate. | 79.4 |
| 25 | 2,3,3-trichloroallyl diethylthionocarbamate. | 75.2 |
| 26 | 2,3,3-trichloroallyl dipropylthionocarbamate. | 84.1 |
| 27 | 2,3,3-trichloroallyl 1-pyrrolidinecarbothionate. | 68.6 |
| 28 | 2,3,3-trichloroallyl dimethylthionocarbamate. | 82.0 |
| 29 | 2,3,3-trichloroallyl diisopropylthionocarbamate. | 96.0 |
| 30 | 2-chloroallyl 1-hexamethyleniminecarbothionate. | 95.7 |
| 31 | 3-chloroallyl 1-hexamethyleniminecarbothionate. | 91.5 |
| 32 | 2,3,3-trichloroallyl N-cyclohexyl-N-ethyl-thionocarbamate. | 96.8 |
| 33 | cis- and trans-2,3-dichloroallyl N-cyclohexyl-N-ethylthionocarbamate. | 71.0 |

Table II illustrates the pre-emergent herbicidal activity of typical disubstituted haloalkenyl thionocarbamates. The ester was emulsified in water and the emulsion applied as a spray. In this manner, the active ingredient at the dosage indicated was applied to the ground of seeded plots before the grass or other plants emerged:

TABLE II

| Active Ingredient | Lbs./Acre | Results Observed |
|---|---|---|
| 2-chloroallyl diethylthionocarbamate | 5 | Severe phytotoxicity to wild oat, brome grass, rye grass, buckwheat, mustard (radish), foxtail, barnyard grass and crab grass; moderate phytotoxicity to cotton and pigweed. |
| 2-chloroallyl dipropylthionocarbamate | 5 | Severe phytotoxicity to wild oat, brome grass, rye grass, buckwheat, beet-sugar, foxtail, barnyard grass, crab grass and pigweed; moderate phytotoxicity to cotton. |
| 2-chloroallyl dimethylthionocarbamate | 5 | Severe phytotoxicity to wild oat, brome grass, rye grass, cotton and barnyard grass; moderate phytotoxicity to foxtail and pigweed. |
| 2-chloroallyl dibutylthionocarbamate | 25 | Severe phytotoxicity to wild oat, rye grass, barnyard grass, crab grass, pigweed and sorghum. |
| 2-chloroallyl 4-morpholinecarbothionate | 25 | Severe phytotoxicity to brome grass; moderate phytotoxicity to wild buckwheat. |
| cis- and trans-2,3,-dichloroallyl diethylthionocarbamate | 25 | Severe phytotoxicity to wild oat, brome grass, rye grass, foxtail, crab grass, pigweed and sorghum; moderate phytotoxicity to morning glory. |
| cis- and trans-2,3-dichloroallyl dipropylthionocarbamate | 25 | Severe phytotoxicity to wild oat, brome grass, rye grass, crab grass, mixture of grasses and sorghum; moderate phytotoxicity to beet-sugar and tomato. |
| cis-2,3-dichloroallyl diisopropylthionocarbamate | 25 | Severe phytotoxicity to tomato; moderate phytotoxicity to a mixture of grasses, wild oat, brome grass and rye grass. |
| trans-2,3-dichloroallyl diisopropylthionocarbamate | 25 | Severe phytotoxicity to a mixture of grasses, wild oat, rye grass, foxtail and crab grass; moderate phytotoxicity to morning glory, brome grass, wild buckwheat, tomato and mixture of broadleaf plants. |
| 3,3-dichloroallyl N-cyclohexyl-N-isopropylthionocarbamate. | 5 | Severe phytotoxicity to a mixture of grasses, wild oat, brome grass, rye grass, foxtail, crab grass, pigweed and sorghum. |
| 3,3-dichloroallyl N-cyclohexyl-N-ethylthionocarbamate | 5 | Severe phytotoxicity to a mixture of grasses, wild oat, rye grass, foxtail, crab grass and sorghum. |

TABLE II—Continued

| Active Ingredient | Lbs./Acre | Results Observed |
|---|---|---|
| 3,3-dichloroallyl N-cyclohexyl-N-methylthionocarbamate. | 25 | Severe phytotoxicity to a mixture of grasses, wild oat, rye grass, crab grass, pigweed, wild buckwheat and sorghum; moderate phytotoxicity to morning glory and mixture of broadleaf plants. |
| 3,3-dichloroallyl N-cyclohexyl-N-propylthionocarbamate. | 25 | Severe phytotoxicity to a mixture of grasses, wild oat, foxtail, crab grass, pigweed and sorghum; moderate phytotoxicity to pigweed and wild buckwheat. |
| 2-chloroallyl N-cyclohexyl-N-methylthionocarbamate | 25 | Severe phytotoxicity to a mixture of grasses, wild oat, brome grass, rye grass, crab grass, pigweed, wild buckwheat and sorghum; moderate phytotoxicity to mixture of broadleaf plants, beet-sugar and tomato. |
| 2-chloroallyl N-cyclohexyl-N-ethylthionocarbamate | 25 | Severe phytotoxicity to a mixture of grasses, mixture of broadleaf plants, wild oat; brome grass, rye grass, beet-sugar, foxtail, crab grass, pigweed, wild buckwheat and sorghum; moderate phytotoxicity to morning glory, soybean and tomato. |
| 2-chloroallyl N-cyclohexyl-N-propylthionocarbamate | 25 | Severe phytotoxicity to wild oat, mixture of grasses, foxtail, crab grass and sorghum; moderate phytotoxicity to brome grass, beet-sugar and pigweed. |
| 2-chloroallyl N-cyclohexyl-N-isopropylthionocarbamate. | 25 | Severe phytotoxicity to wild oat, crab grass, pigweed and wild buckwheat; moderate phytotoxicity to mixture of grasses and rye grass. |
| 2,3,3-trichloroallyl N-cyclohexyl-N-ethyl-thionocarbamate. | 25 | Severe phytotoxicity to crab grass; moderate phytotoxicity to wild oat. |
| cis- and trans-2,3-dichloroallyl N-cyclohexyl-N-ethylthionocarbamate. | 25 | Severe phytotoxicity to a mixture of grasses, wild oat, rye grass, foxtail, crab grass, pigweed and sorghum. |
| cis- and trans-2,3-dichloroallyl 1-hexamethyleniminecarbothionate. | 25 | Severe phytotoxicity to morning glory, beet-sugar, crab grass, pigweed and sorghum; moderate phytotoxicity to rye grass and tomato. |
| 2,3,3-trichloroallyl 1-hexamethylenimine-carbothionate | 25 | Severe phytotoxicity to crab grass and pigweed; moderate phytotoxicity to beet-sugar. |
| 2-chloroallyl 1-pyrrolidine-carbothionate | 25 | Severe phytotoxicity to rye grass, crab grass and pigweed; moderate phytotoxicity to mixture of grasses, mixture of broadleaf plants, brome grass, beet-sugar, wild buckwheat and sorghum. |
| 3,3-dichloroallyl 1-pyrrolidinecarbothionate | 25 | Severe phytotoxicity to morning glory, wild oat, rye grass, foxtail, crab grass, pigweed, tomato and sorghum; moderate phytotoxicity to buckwheat, radish and beet-sugar. |
| 3-chloro-2-butenyl 1-pyrrolidinecarbothionate | 25 | Severe phytotoxicity to mixture of grasses, brome grass, beet-sugar, pigweed, soybean and sorghum; moderate phytotoxicity to mixture of broadleaf plants, wild oat, foxtail, crab grass and wild buckwheat. |
| 2,3,3-trichloroallyldiethylthionocarbamate | 25 | Severe phytotoxicity to rye grass, foxtail, crab grass, pigweed, soybean and tomato; moderate phytotoxicity to beet-sugar and sorghum. |
| 2,3,3-trichloroallyl dipropylthionocarbamate | 25 | Severe phytotoxicity to morning glory, rye grass, beet-sugar, foxtail, crab grass, pigweed and sorghum; moderate phytotoxicity to wild oat. |
| 3-chloroallyl 1-pyrrolidine-carbothionate | 25 | Severe phytotoxicity to pigweed; moderate phytotoxicity to mixture of grasses, mixture of broad-leaf plants, morning glory, wild oat, brome grass, rye grass, beet-sugar, crab grass and tomato. |
| 2,3-dichloroallyl 1-pyrrolidinecarbothionate | 25 | Severe phytotoxicity to wild oat, brome grass, rye grass, radish, beet-sugar, foxtail, crab grass, pigweed, tomato and sorghum; moderate phytotoxicity to morning glory. |
| 2,3,3-trichloroallyl 1-pyrrolidinecarbothionate | 25 | Severe phytotoxicity to brome grass, rye grass, foxtail, crab grass, pigweed and sorghum; moderate phytotoxicity to wild oat. |
| 2,3,3-trichloroallyl dibutylthionocarbamate | 25 | Severe phytotoxicity to brome grass; moderate phytotoxicity to pigweed. |
| 2,3,3-trichloroallyl dimethylthionocarbamate | 5 | Severe phytotoxicity to soybean; moderate phytotoxicity to foxtail and crab grass. |
| 2,3,3-trichloroallyl diisopropylthionocarbamate | 5 | Moderate phytotoxicity to wild oat, foxtail and crab grass. |
| 2-chloroallyl 1-hexamethyleniminecarbothionate | 5 | Severe phytotoxicity to a mixture of grasses, brome grass, rye grass, foxtail, crab grass, pigweed, wild buckwheat and sorghum; moderate phytotoxicity to wild oat. |
| 3-chloroallyl 1-hexamethyleniminecarbothionate | 5 | Moderate phytotoxicity to brome grass, foxtail and crab grass. |

When tested at lower concentrations, 2-chloroallyl diethylthionocarbamate completely controlled grasses at one pound per acre and it was still very active on most grasses at one-half per acre.

An aqueous spray containing 0.5% of 2-chloroallyl diethylthionocarbamate was applied to the foliage of grass and to the foilage of bean and broadleaf plants. Sever phytotoxicity to grasses was observed.

The foregoing only illustrative of the important new class herein defined which control vegetation although the amounts required for effective control will vary. Optimum activity is achieved with 2-chloroallyl esters represented by: 2-chloroallyl N-isopropyl-N-allylthionocarbamate, 2-chloroallyl N-2 - chloroallyl - N - isopropylthionocarbamate, 2-chloroallyl N-2-choroallyl-N-3-methoxypropythionocarbamate, 2-chlorollyl diallylthionocarbamate, 2-choroallyl 1-piperidinecarbothionate, 2-chloroallyl 5-ethyl-2-methyl-1-piperidinecarbothionate and 2-chloroallyl 5-ethyl-3-methyl-1-piperidinecarbothionate.

It is intended to cover all changes and modifications of the examples of the invention herein chosen for purposes of disclosure which do not constitute departures from the spirit and scope of the invention.

What is claimed is:

1. A halogen substituted 2-alkenyl ester of a thionocarbamic acid in which the alkenyl group contains less than five carbon atoms all of the halogen being attached to unsaturated carbon and the nitrogen is attached to one cyclohexyl and to one lower alkyl.

2. A compound of the formula

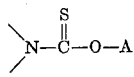

where A is halogen substituted 2-alkenyl containing less than five carbon atoms and having all the halogen attached to unsaturated carbon and the valences on the nitrogen are satisfied by a member of the class consisting of lower alkyl, lower 2-alkenyl, lower alkoxy substituted lower alkyl, lower alkenoxy substituted lower alkyl, cyano substituted lower alkyl, cyclohexyl, cyclohexenyl, monochloroallyl, phenoxy substituted lower alkyl and radicals which the the nitrogen are a member of the group consisting of 4-phenylpiperazinyl, morpholinyl, 2,6-dimethylmorpholinyl, pyrrolidinyl, piperidinyl, 2-methylpiperidinyl, 5-ethyl-2-methylpiperidinyl, 5-ethyl-3-methyl-piperidinyl, 2,4,6-trimethylpiperidinyl and 1-hexamethylenimine.

3. A compound of the formula

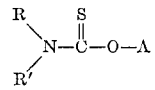

where R and R' are lower alkyl and A is halogen substituted 2-alkenyl containing less than five carbon atoms all of the halogen being attached to unsaturated carbon.

4. A compound of the formula

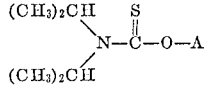

where A is halogen substituted 2-alkenyl containing less than five carbon atoms all of the halogen being attached to unsaturated carbon.

5. A compound of the formula

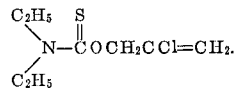

6. A compound of the formula
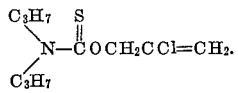
7. A compound of the formula
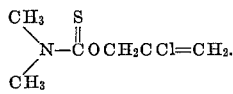
8. A compound of the formula
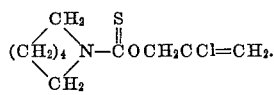
References Cited by the Examiner
UNITED STATES PATENTS
| | | | |
|---|---|---|---|
| 2,187,719 | 1/1940 | Williams | 260—239 |
| 2,650,876 | 9/1953 | Stewart | 260—293.4 |
| 2,723,989 | 11/1955 | Harman | 260—455 |
| 2,744,898 | 5/1956 | Harman et al. | 260—455 |
| 2,812,247 | 11/1957 | Gysin et al. | 71—2.3 |
| 2,919,182 | 12/1959 | Harman et al. | 260—455 |
| 2,992,091 | 7/1961 | Harman et al. | 260—455 |
| 3,078,153 | 2/1963 | Harmon et al. | 71—2.5 |
ALEX MAZEL, *Primary Examiner.*
ALTON D. ROLLINS, *Assistant Examiner.*